(12) United States Patent
Meehan

(10) Patent No.: US 7,671,492 B1
(45) Date of Patent: Mar. 2, 2010

(54) REPELLING MAGNETIC FIELD ENGINE

(76) Inventor: William J. Meehan, 25 S. Myrtle St., Vineland, NJ (US) 08360

( * ) Notice: Subject to any disclaimer, the term of this patent is extended or adjusted under 35 U.S.C. 154(b) by 28 days.

(21) Appl. No.: 11/945,348

(22) Filed: Nov. 27, 2007

(51) Int. Cl.
H02K 33/00 (2006.01)
(52) U.S. Cl. ....................................................... 310/15
(58) Field of Classification Search .................... 310/15, 310/16, 20, 23, 103
See application file for complete search history.

(56) References Cited

U.S. PATENT DOCUMENTS 7,330,094 B2 * 2/2008 McCarthy ................... 335/306

* cited by examiner

Primary Examiner—Javaid Nasri

(57) ABSTRACT

A repelling magnetic field engine. An illustrative embodiment of the engine includes a cylinder, a piston reciprocally mounted in the cylinder and emitting a static magnetic field, a magnet assembly provided in the cylinder and emitting a dynamic magnetic field having the same magnetic polarity as the static magnetic field and a crankshaft drivingly engaged by the piston.

9 Claims, 8 Drawing Sheets

US 7,671,492 B1

REPELLING MAGNETIC FIELD ENGINE

FIELD

The present disclosure relates to engines. More particularly, the present disclosure relates to a repelling magnetic field engine which utilizes repelling magnetic fields as a power source.

BACKGROUND

Due to the rising costs of gasoline, much research has recently been expended on alternative fuels. Alternative methods of powering automobiles have included the use of electric vehicles which utilize electric motors to transmit mechanical power to wheels of an automobile. Electric power is considered desirable because it is a renewable power source and is environmentally-friendly.

SUMMARY

The present disclosure is generally directed to a repelling magnetic field engine. An illustrative embodiment of the engine includes a cylinder, a piston reciprocally mounted in the cylinder and emitting a static magnetic field, a magnet assembly provided in the cylinder and emitting a dynamic magnetic field having the same magnetic polarity as the static magnetic field and a crankshaft drivingly engaged by the piston.

DETAILED DESCRIPTION

Figure 9:
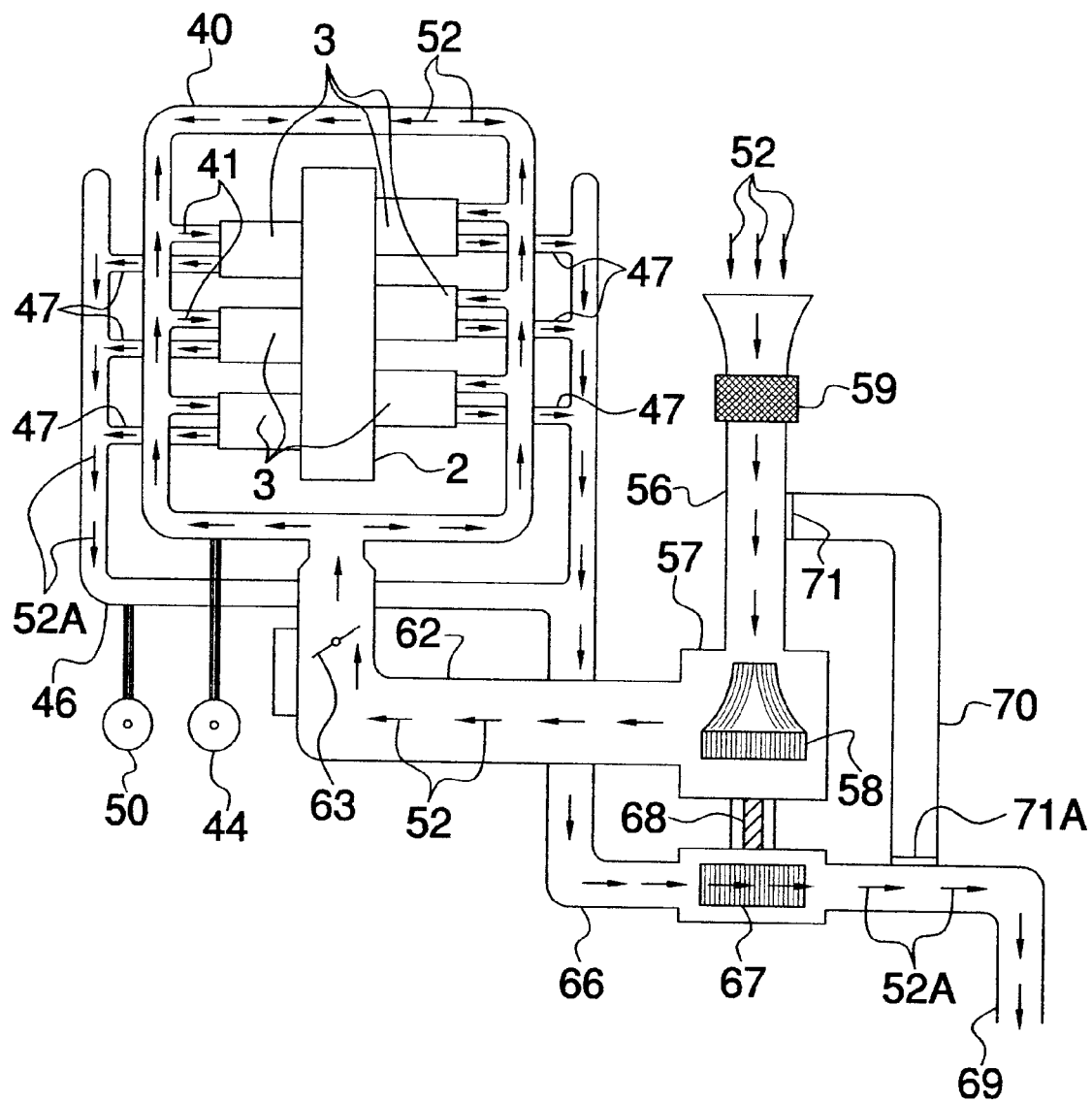
FIG. 9 is a schematic view of an illustrative embodiment of the repelling magnetic field engine.

Referring initially to FIG. 9 of the drawings, an illustrative embodiment of the repelling magnetic field engine, hereinafter engine, is generally indicated by reference numeral 1. The engine 1 includes a cylinder support 2. Multiple cylinders 3, the details of which will be hereinafter described, are supported by the cylinder support 2. An air intake system 40 is disposed in pneumatic communication with each cylinder 3 through a corresponding air intake conduit 41. An air exhaust system 46 is disposed in pneumatic communication with each cylinder 3 through a corresponding air exhaust conduit 47. An intake pressure gauge 44 may communicate with the air intake system 40 to measure and indicate the pressure of intake air 52 in the air intake system 40. An exhaust pressure gauge 50 may communicate with the air exhaust system 46 to measure and indicate the pressure of exhaust air 52a in the air exhaust system 46.

An air intake conduit 62 is disposed in pneumatic communication with the air intake system 40. An air intake valve 63 may be provided in the air intake conduit 62. An induction conduit 56 is disposed in pneumatic communication with the air intake conduit 62. An induction filter 59 may be provided in the induction conduit 56. A compression chamber 57, in which is provided a compressor 58, may be provided between the induction conduit 56 and the air intake conduit 62.

An air exhaust conduit 66 is disposed in pneumatic communication with the air exhaust system 46. A turbine 67 may be provided in the air exhaust conduit 66. The turbine 67 may be drivingly engaged by the compressor 58 through a turbine drive shaft 68. A compressor bypass line 70 may communicate with the induction conduit 56 and the air exhaust conduit 66. An air door 71 may be provided between the induction conduit 56 and the compressor bypass line 70. An air door 71a may be provided between the compressor bypass line 70 and the air exhaust conduit 66. A tail pipe 69 may extend from the air exhaust conduit 66.

Figure 4:
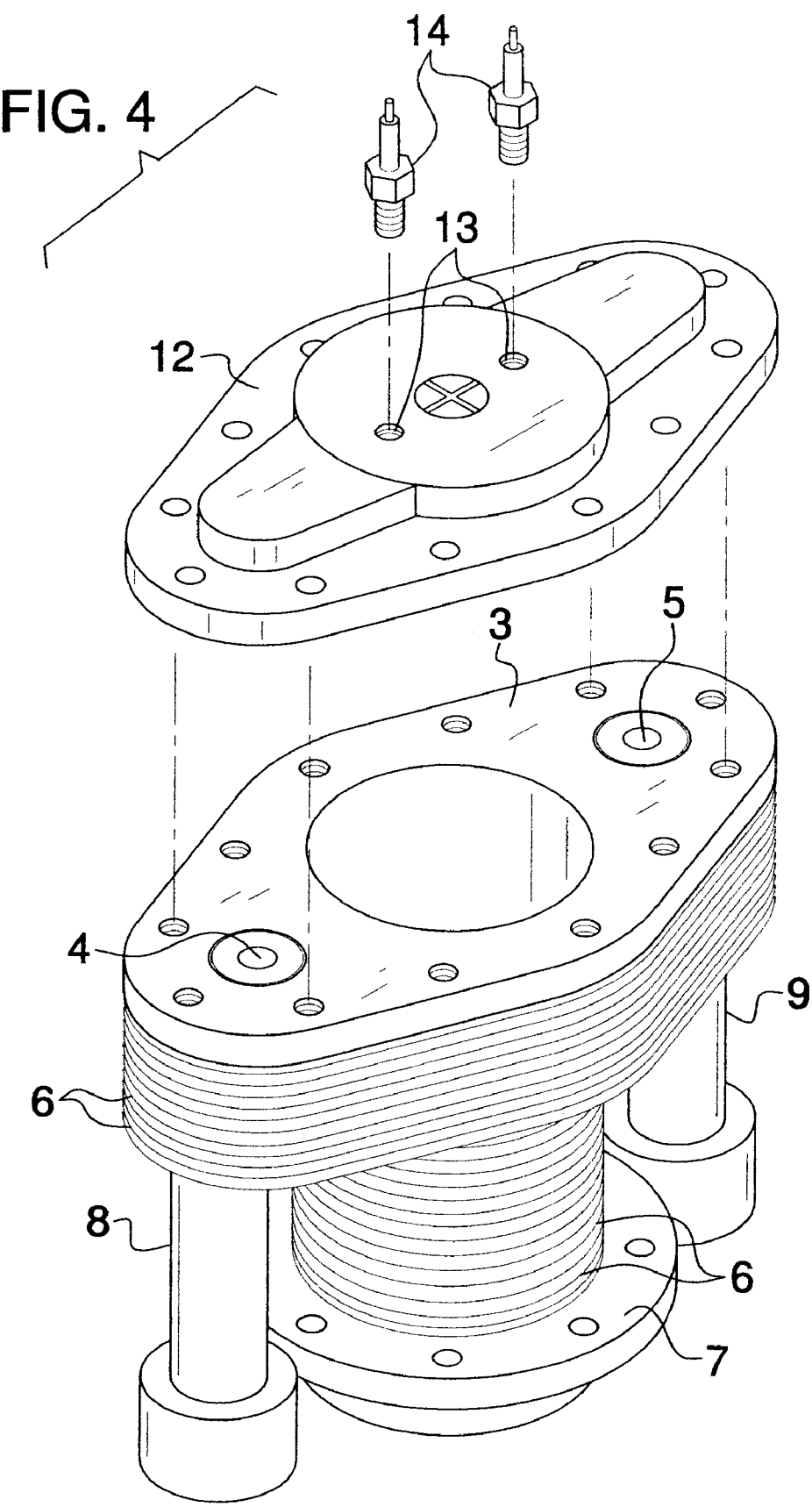
FIG. 4 is an exploded perspective view of a cylinder of an illustrative embodiment of the repelling magnetic field engine.

Referring next to FIGS. 4-7 of the drawings, each cylinder 3 of the engine 1 includes an intake valve 4 which is reciprocally mounted in an intake push rod tube 8 and an exhaust valve 5 which is reciprocally mounted in an exhaust push rod tube 9. As shown in FIG. 4, multiple cooling fins 6 may be provided on the exterior of each cylinder 3. A cylinder head 12 is provided on each cylinder 3. A pair of spaced-apart capacitor openings 13, in which is seated a pair of spaced-apart high-voltage capacitors 14, is provided in the cylinder head 12. The high-voltage capacitors 14 are connected to an electronic control system (not shown). As shown in FIG. 4, a cylinder mount flange 7 may be provided on each cylinder 3 to facilitate attachment of the cylinder 3 to the cylinder support 2 (FIG. 9) of the engine 1.

Figure 6:
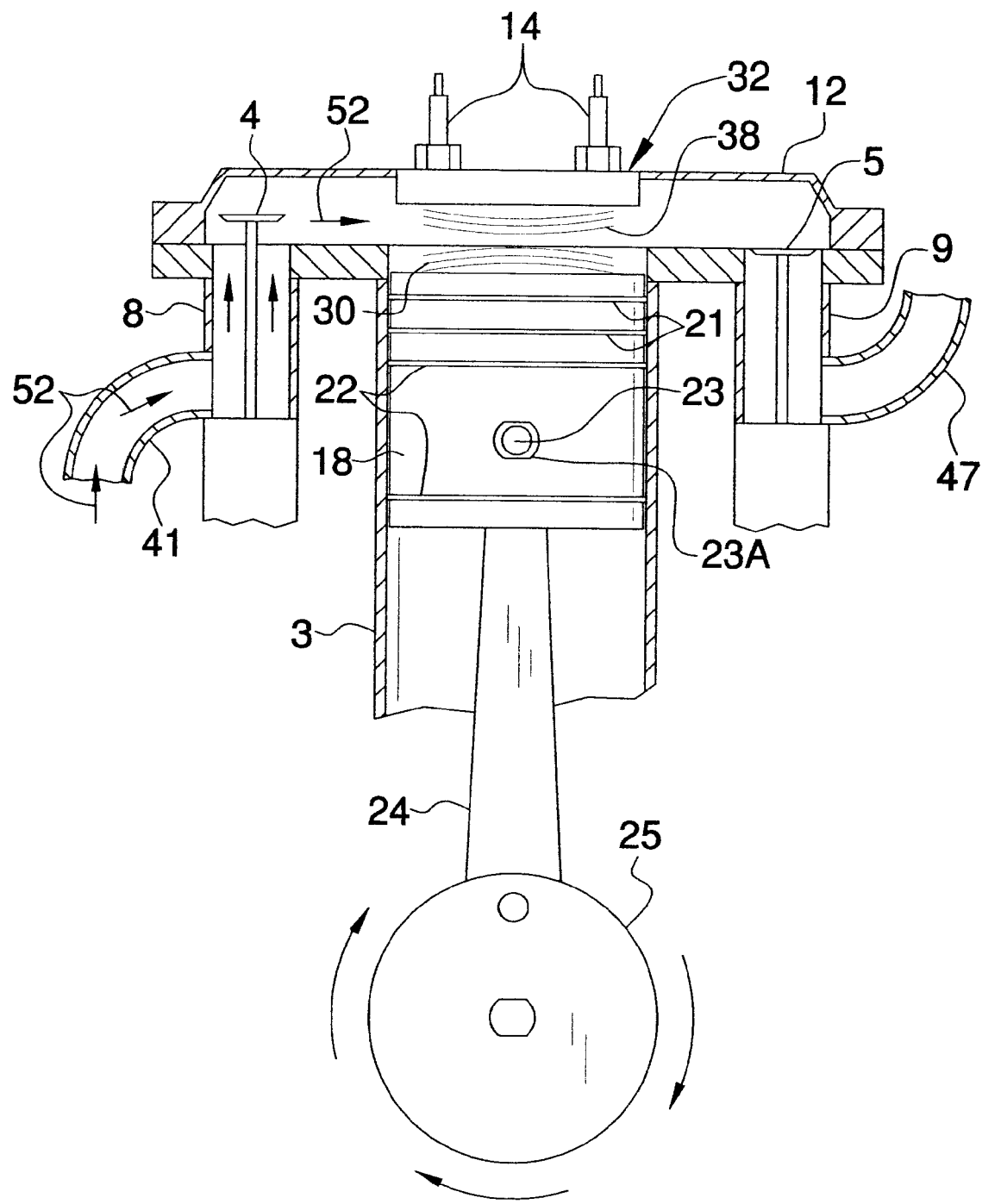
FIG. 6 is a sectional view of a cylinder, with a piston shown at top dead center (TDC) prior to a power stroke.
Figure 7:
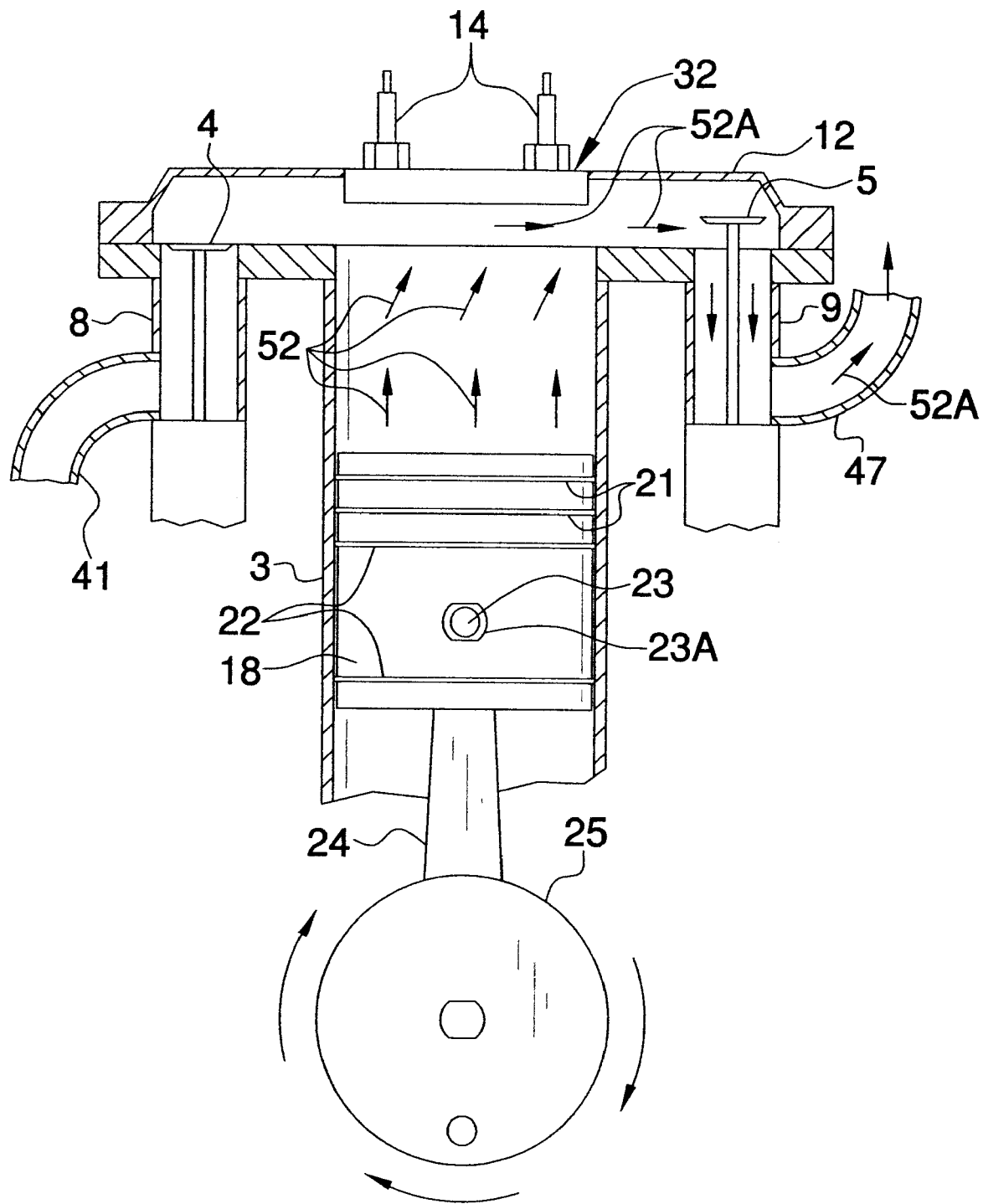
FIG. 7 is a sectional view of a cylinder, with a piston shown at bottom dead center (BDC) after a power stroke.

As shown in FIGS. 6 and 7, each air intake conduit 41 is disposed in pneumatic communication with each corresponding intake push rod tube 8. The intake push rod tube 8 is disposed in pneumatic communication with the interior of the cylinder 3. The exhaust push rod tube 9 is disposed in pneumatic communication with the interior of the cylinder 3. The air exhaust conduit 47 is disposed in fluid communication with the exhaust push rod tube 9.

Figure 5:
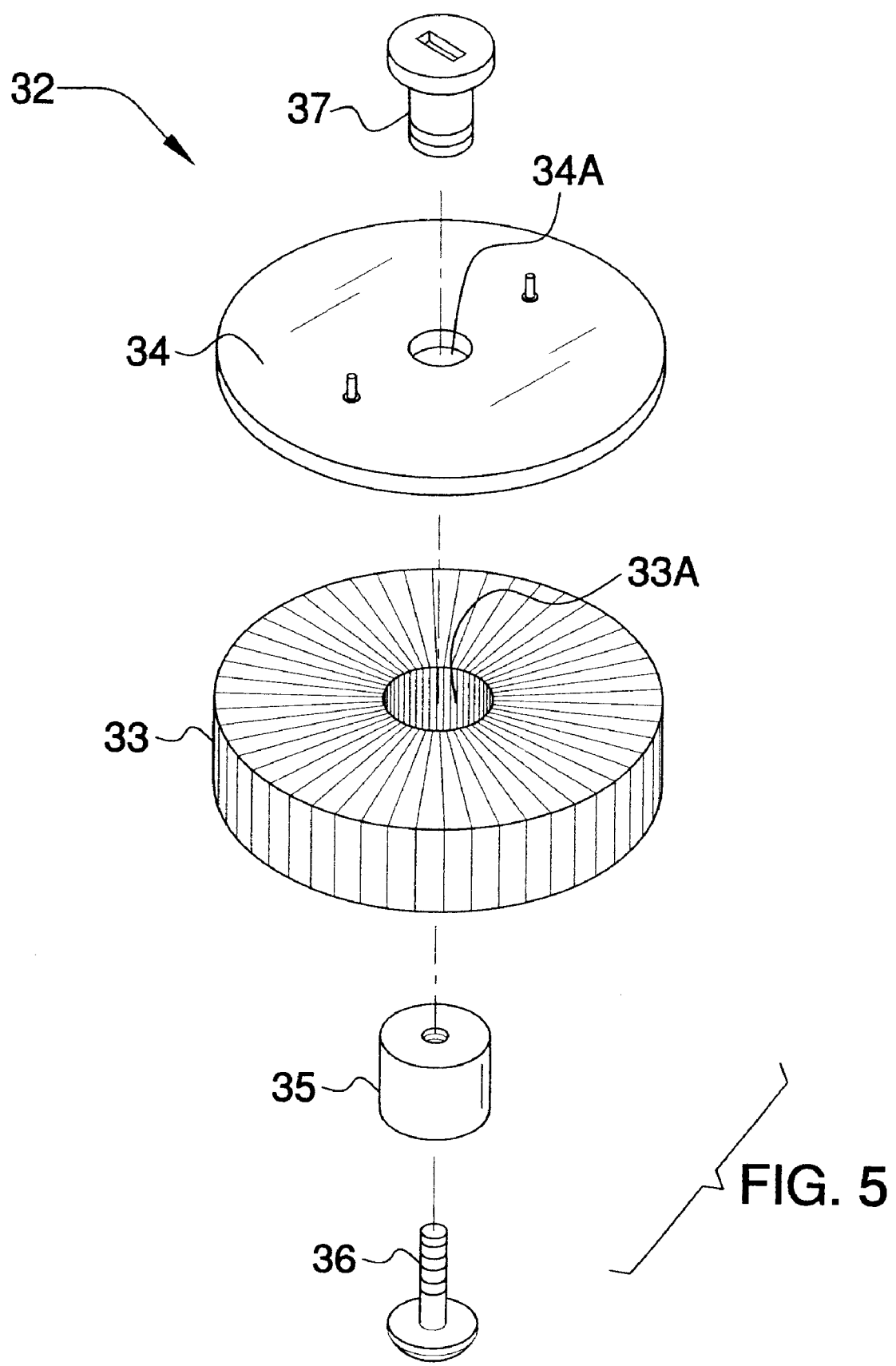
FIG. 5 is an exploded perspective view of a magnet assembly of an illustrative embodiment of the repelling magnetic field engine.

As shown in FIG. 5, a magnet assembly 32 is provided in the cylinder head 12 of each cylinder 3. The magnet assembly 32 includes a toroidal field coil 33. A circular high-voltage guide plate 34 is disposed in electrical contact with the field coil 33. An interiorly-threaded pole shoe 35 extends through a central coil opening 33a provided in the field coil 33 and through a central plate opening 34a provided in the high-voltage guide plate 34. An assembly bolt 36 and a mounting head bolt 37 are threaded into respective ends of the pole shoe 35 and secure the high-voltage guide plate 34 into electrical contact with the field coil 33. As shown in FIGS. 6 and 7, the high-voltage capacitors 14 are disposed in electrical contact with the guide plate 34 of the magnet assembly 32. As shown in FIG. 6, the high-voltage capacitors 14 are adapted to induce a reversible dynamic magnetic field 38 in the field coil 33 of the magnet assembly 32, as will be hereinafter described.

Figure 1:
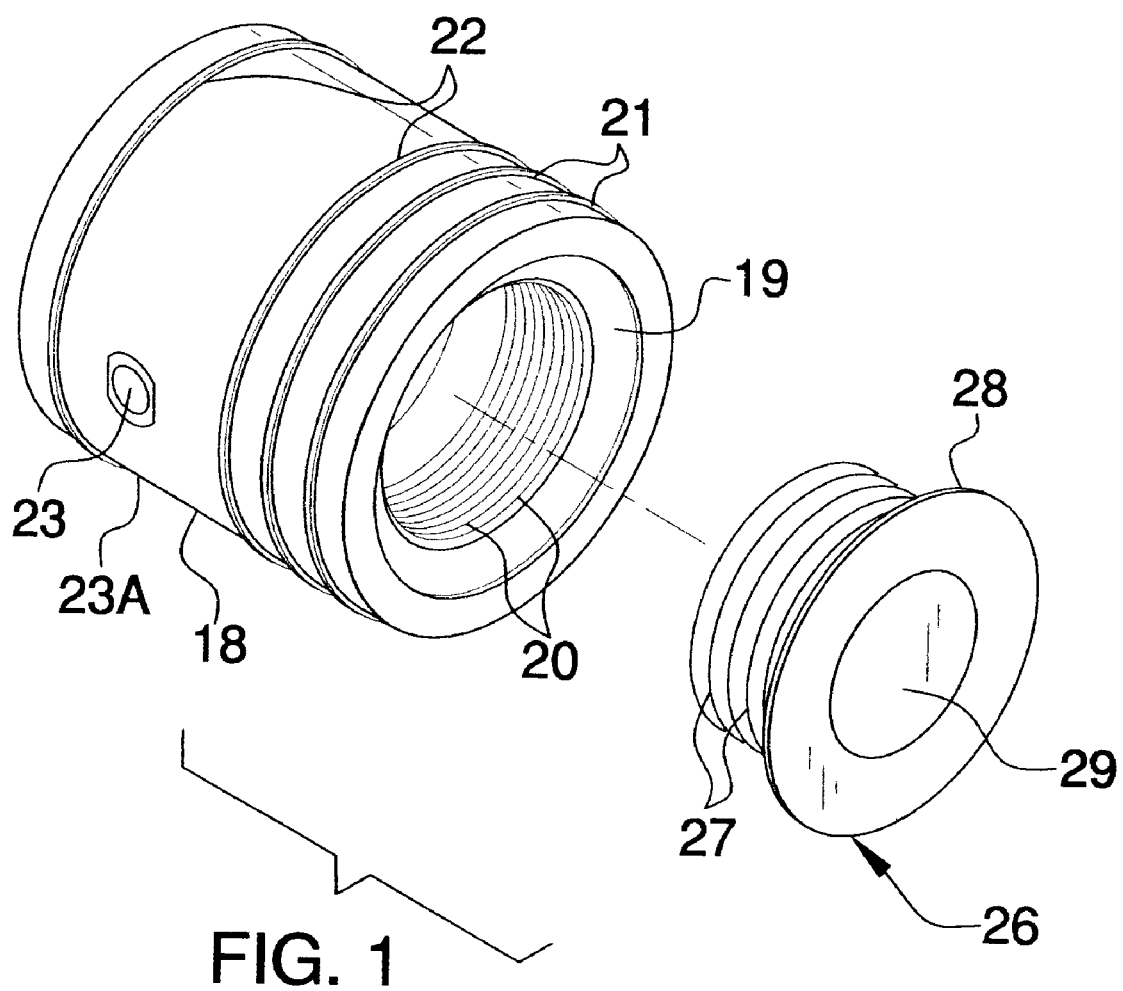
FIG. 1 is an exploded perspective view of a piston of an illustrative embodiment of the repelling magnetic field engine.
Figure 2:
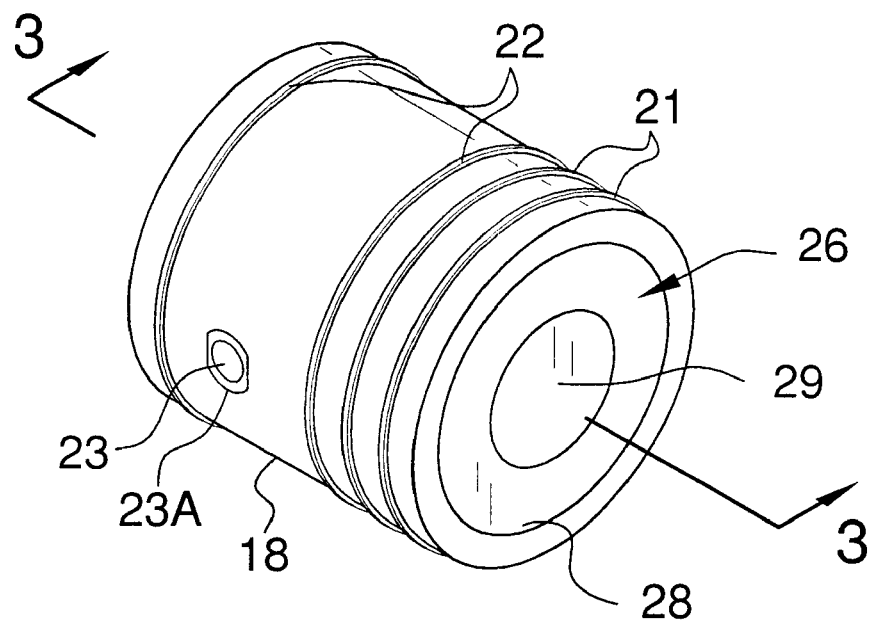
FIG. 2 is a perspective view of the piston.
Figure 3:
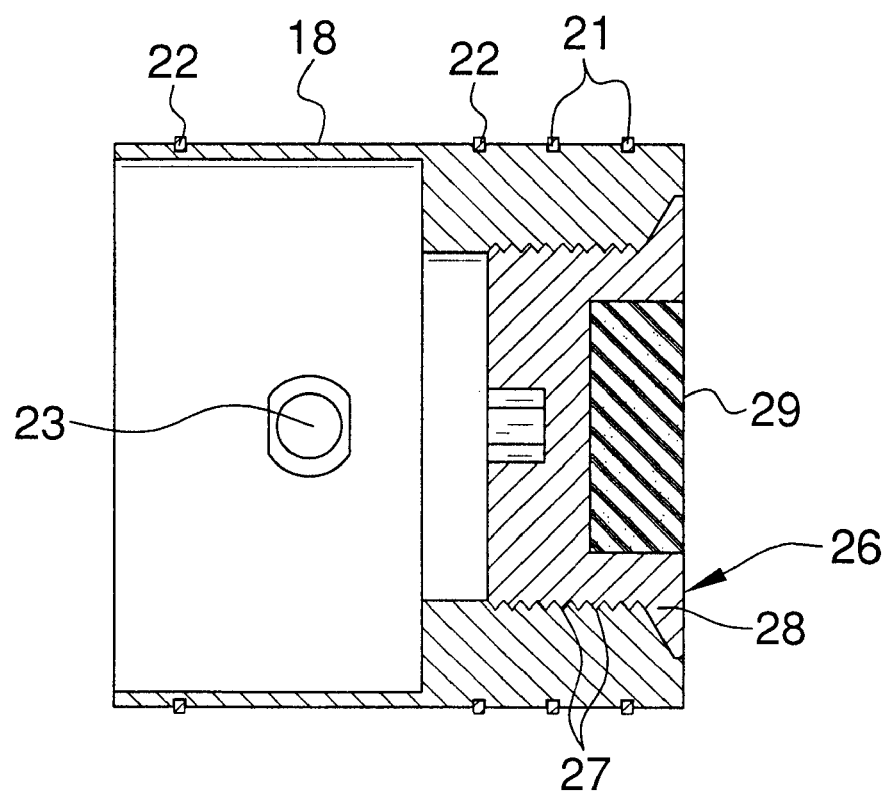
FIG. 3 is a longitudinal sectional view of the piston, taken along section lines 3-3 in FIG. 2.

Referring next to FIGS. 1-3, 6 and 7 of the drawings, a piston 18 is reciprocally disposed in each cylinder 3. As shown in FIG. 1, the piston 18 may have an angled annular piston top seat 19. Multiple compression rings 21 and oil rings 22 may be provided in the exterior surface of the piston 18. A piston pin 23 may extend through a pair of piston pin bosses 23a provided in the piston 18 for purposes which will be hereinafter described.

Each piston 18 has a piston head 26 which may be attached to the piston 18 using any suitable mechanism known to those skilled in the art. For example, the piston head 26 may include piston head threads 27 which engage interior piston threads 20 provided in the piston 18. The piston head 26 may include an outwardly-extending piston head flange 28 which mates with the piston top seat 19 of the piston 18. Each of the piston top seat 19 and the piston head flange 28 may have an angle of about 30 degrees, for example. A piston magnet 29 is provided in the piston head 28. As shown in FIG. 6, the piston magnet 29 emits a static magnetic field 30 having a magnetic polarity which is the same as that of the dynamic magnetic field 38 emitted by the magnet assembly 32.

As shown in FIGS. 6 and 7, the compression rings 21 and oil rings 22 engage the interior surface of each cylinder 3. A piston shaft 24 is connected to the piston pin 23 and extends from each piston 18. The piston shaft 24 of each piston 18 drivingly engages a crankshaft 25.

Referring again to FIGS. 6, 7 and 9 of the drawings, in typical operation of the engine 1, when each reciprocating piston 18 in each cylinder 3 reaches top dead center (TDC), as shown in FIG. 6, the high-voltage capacitors 14 induce a dynamic magnetic field 38 which repels the magnetic field 30 of the piston magnet 29 (FIG. 1) in the piston head 26 of each corresponding piston 18. This repelling magnetic field drives the piston 18 in the cylinder 3 away from the cylinder head 12. As the piston 18 travels in the cylinder 3 from top dead center (FIG. 6) to bottom dead center (BDC), as shown in FIG. 7, the high-voltage capacitors 14 cause the magnetic field 38 to diminish and then cease. The piston 18 then travels in the cylinder 3 from bottom dead center back to top dead center as shown in FIG. 6, at which time the high-voltage capacitors 14 again induce the repelling magnetic field 38 to repel the magnetic field 30 of the piston 18 and drive the piston 18 away from the cylinder head 12. This concerted reciprocating action of the pistons 18 in the respective cylinders 3 rotates the crankshaft 25.

As shown in FIG. 9, as the pistons 18 reciprocate in the respective cylinders 3 (FIGS. 6 and 7), intake air 52 flows into and through the induction conduit 56; compression chamber 57; air intake conduit 62; air intake system 40; and into the air intake conduit 41 connected to each cylinder 3. As each piston 18 travels from top dead center (FIG. 6) to bottom dead center (FIG. 7) in the corresponding cylinder 3, the intake valve 4 opens and the exhaust valve 5 closes, as shown in FIG. 6. Therefore, negative pressure in the cylinder 3 induced by the piston 18 draws intake air 52 from the air intake conduit 41 and through the intake push rod tube 8; the cylinder head 12; and into the cylinder 3, respectively.

As it travels in the cylinder 3 from bottom dead center (FIG. 7) back to top dead center (FIG. 6), the intake valve 4 closes and the exhaust valve 5 opens, as shown in FIG. 7. Therefore, the piston 18 pushes the intake air 52 from the cylinder 3; the cylinder head 12; the exhaust push rod tube 9; and into the air exhaust conduit 47, respectively. The exhaust air 52a then passes through the air exhaust system 46 and the air exhaust conduit 66, respectively, and is discharged from the tailpipe 69. The turbine 67 in the air exhaust conduit 66 may facilitate flow and discharge of the exhaust air 52a. The intake air 52 facilitates cooling of the piston 18 and cylinder 3 during the power stroke of each piston 18.

Figure 8:
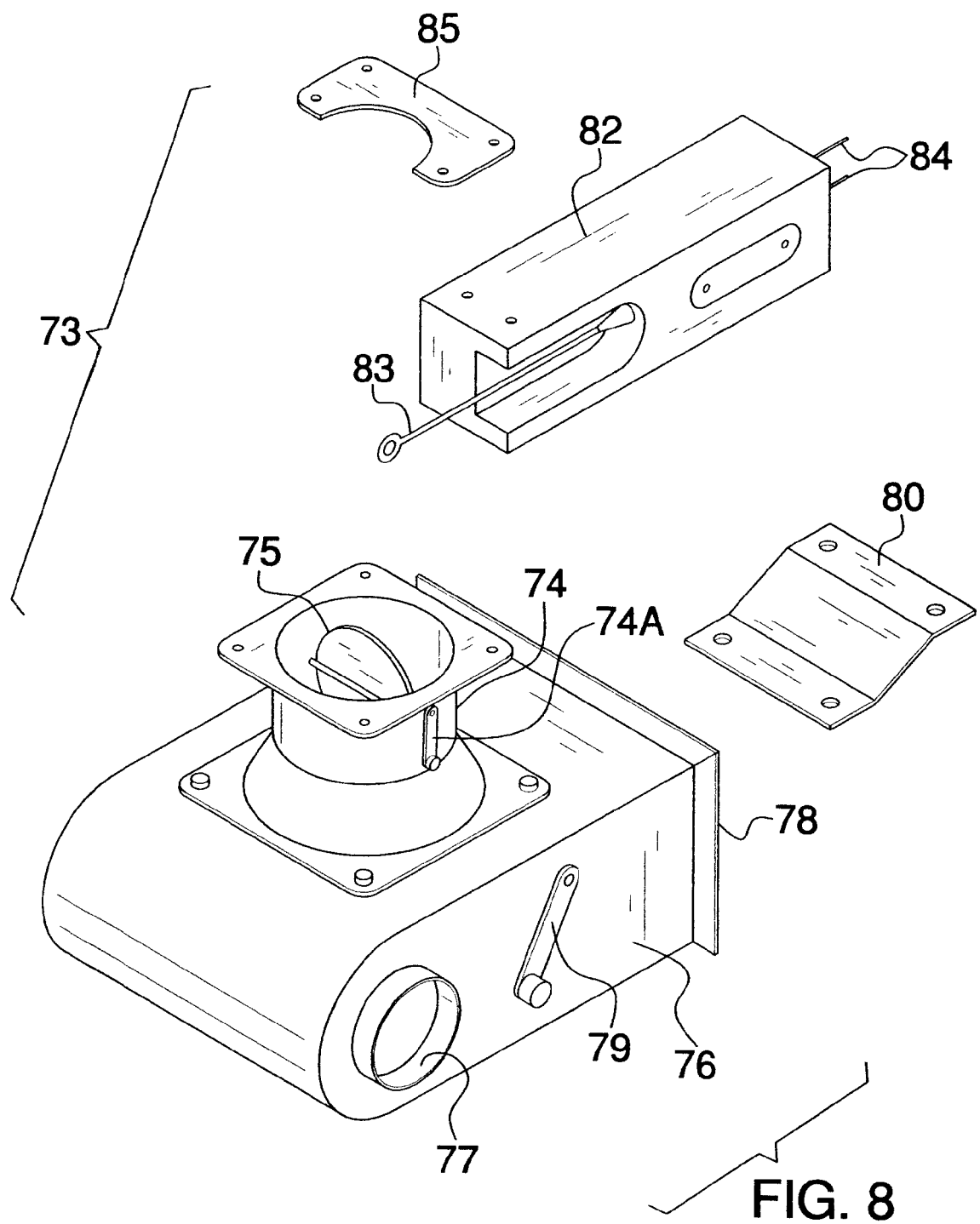
FIG. 8 is a perspective view of a throttle assembly of an illustrative embodiment of the repelling magnetic field engine.

Referring next to FIG. 8 of the drawings, the engine 1 may be fitted with a carburetor assembly 73. The carburetor assembly 73 may include, for example, a carburetor 74 which is disposed in pneumatic communication with the induction conduit 56 (FIG. 9) of the engine 1. The carburetor 74 may be attached to the induction conduit 56 using a suitable carburetor mount bracket 80, for example. A carburetor valve 75 is provided in the carburetor 74. A carburetor valve control arm 74a may engage the carburetor valve 75 to facilitate rotation of the carburetor valve 75 in the carburetor 74. An air box 76 having a heat inlet 77 and an air filter 78 is pneumatically connected to the carburetor 74. A carburetor heat control arm 79 may be provided on the air box 76.

An electrical accelerator system 82 is attached to a suitable support (not shown) such as using a suitable mounting bracket 85, for example. A control arm 83 extends from the accelerator system 82 and is coupled to the carburetor valve control arm 74a of the carburetor 74. Lead cables 84 are connected to the control arm 83 and extend from the accelerator system 82. The lead cables 84 are connected to a carburetor control system (not shown). Accordingly, the quantity or volume of air which enters the engine 1 through the induction conduit 56 may be selectively controlled by varying the angle of the carburetor valve 75 in the carburetor 74 by operation of the accelerator system 82.

While the illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A repelling magnetic field engine, comprising:
   a cylinder;
   a piston reciprocally mounted in said cylinder and emitting a static magnetic field;
   a magnet assembly comprises a pair of spaced-apart, high-voltage capacitors provided in said cylinder and emitting a dynamic magnetic field having the same magnetic polarity as said static magnetic field; and
   a crankshaft drivingly engaged by said piston.

2. The engine of claim 1 wherein said piston comprises a piston head and a piston magnet provided in said piston head, and wherein said piston magnet emits said static magnetic field.

3. The engine of claim 1 wherein said cylinder comprises a cylinder head and said magnet assembly is carried by said cylinder head.

4. The engine of claim 1 further comprising a plurality of cooling fins provided on said cylinder.

5. The engine of claim 1 further comprising a cylinder support and wherein said cylinder is carried by said cylinder support.

6. The engine of claim 1 further comprising an intake valve and an exhaust valve disposed in pneumatic communication with said cylinder and an air intake system disposed in pneumatic communication with said intake valve and an air exhaust system disposed in pneumatic communication with said exhaust valve.

7. The engine of claim 6 further comprising an induction conduit disposed in pneumatic communication with said air intake system.

8. The engine of claim 7 further comprising an air intake conduit between said induction conduit and said air intake system.

9. The engine of claim 8 further comprising a compression chamber between said induction conduit and said air intake conduit and a compressor provided in said compression chamber.

* * * * *